United States Patent Office 3,189,634
Patented June 15, 1965

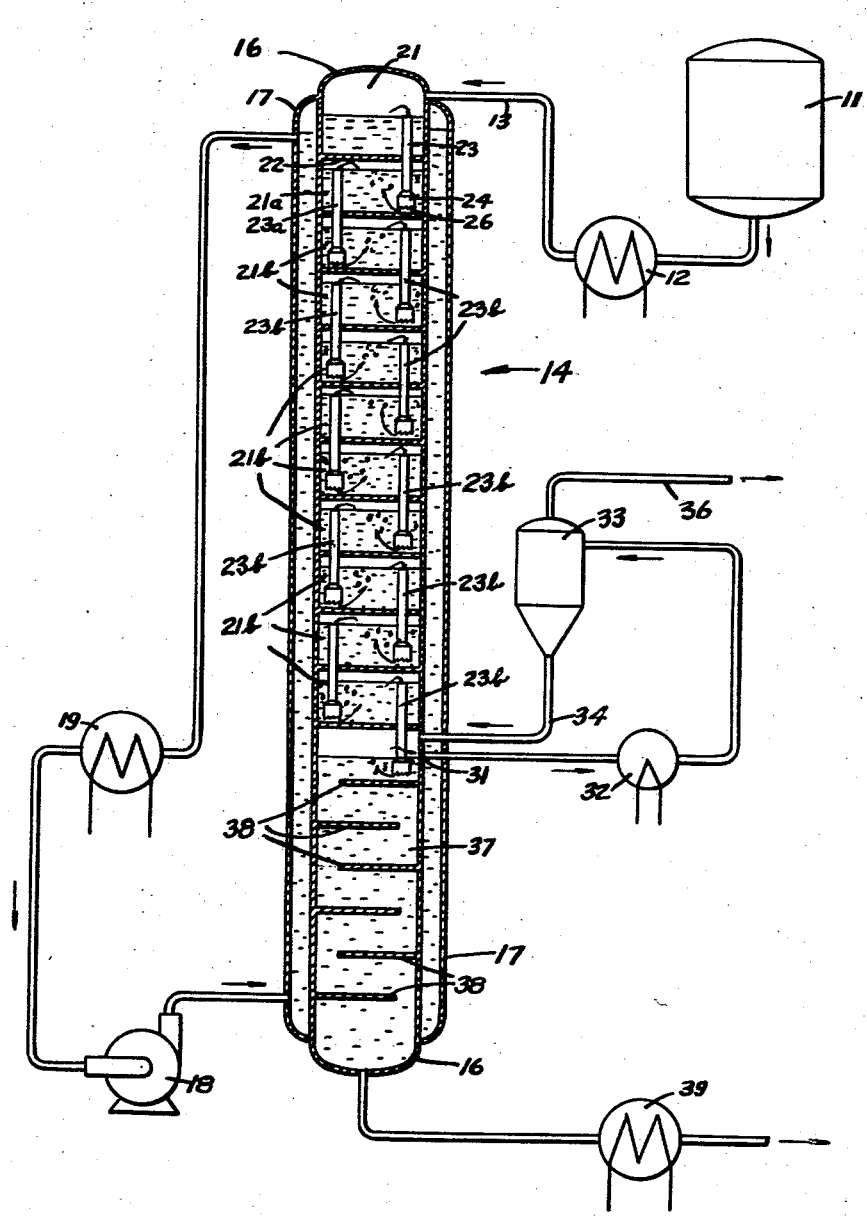

3,189,634
PHOSPHORUS ESTER PRODUCTION
Edward N. Wheeler, Arthur W. Schnizer, and Porter L. Pickard, Corpus Christi, Tex., assignors to Celanese Corporation of America, New York, N.Y., a corporation of Delaware
Filed July 25, 1961, Ser. No. 126,647
7 Claims. (Cl. 260—461)

This invention relates to the production of phosphate esters and to chemical apparatus.

It is an object of this invention to provide a new and economical process for the continuous production of phosphate esters.

Another object of this invention is the provision of a novel chemical apparatus especially suitable for use in the manufacture of phosphate esters.

Other objects of this invention will be apparent from the following detailed description and claims. In this description and claims all proportions are by weight unless otherwise indicated.

The formation of esters of oxyacids of phosphorus in accordance with the present invention preferably involves the known reaction between a chloride of an oxyacid of phosphorus, e.g. phosphorus oxychloride, and a phenol, such as cresols, naphthols, xylenols, ethylphenols, chlorophenols or mixtures thereof. In one aspect of the invention the liquid reacting mixture is fed through a series of separate reaction chambers, passing from one chamber to the next by gravity flow. As the mixture reacts, hydrogen chloride gas is given off. This gas collects at the top of the first chamber and is passed down under pressure into the lower part of the second chamber. The gas then bubbles upwards through the liquid reaction mixture in the second chamber and, together with the hydrogen chloride given off by the continuation of ester-forming reaction in said second chamber, accumulates in the upper portion of said second chamber, from which it is passed through succeeding chambers in an identical manner. The bubbling of the hydrogen chloride gas through the reaction mixture assists the reaction by acting to agitate the reaction mixture. Also, this bubbling of hydrogen chloride gas through the reacting mixture serves to scrub entrained phosphorus oxychloride from the gas and thus makes such phosphorus oxychloride available for further reaction, at the same time facilitating the subsequent purification of the hydrogen chloride for other use.

The invention is illustrated further in the accompanying drawing which is a view of the reactor of this invention in elevation and mainly in cross-section, with portions of the associated equipment shown diagrammatically.

In the drawing reference number 11 designates a mixing vessel to which the reactants and catalyst are fed continuously. The reactants flow, under pressure, from the mixing vessel 11 through a heat-exchanger 12, where they are heated to reaction temperature, and then through a supply line 13 into the top of a reaction tower indicated generally as 14. This reaction tower is conveniently in the form of a vertical cylindrical vessel 16 surrounded, substantially throughout its length, by a jacket 17 for a suitable heating fluid, e.g. hot oil which is circulated by means of a pump 18 through the jacket 17 and through a heating coil 19. The vessel is divided into a series of compartments 21, 21a, 21b (conveniently up to 15 compartments) by horizontal plates 22 and these compartments are connected solely through vertical overflow pipes 23, 23a, 23b open at each end and extending through the plates 22, there being at least one such pipe 23 connecting each compartment to the next lower compartment. The lower portion 24 of each pipe 23 may be enlarged and its horizontal bottom edge 26 is formed in a sawtooth pattern to aid in the uniform discharge of gas bubbles and to help distribute the bubbles through the liquid.

At the start of operation the reaction mixture introduced through line 13 fills the compartment 21 to the level of the top of the pipe 23 therein and overflows through the pipe into the compartment 21a below, where its level rises until it overflows into the next lower compartment 21b and so on. The hydrogen chloride gas given off by the reaction accumulates in the upper portion of the top compartment 21 until its pressure is high enough to force a stream thereof down through the pipe 23 into the next lower compartment 21a, bubbling up through the liquid in the latter compartment and accumulating in the upper portion of said compartment 21a until its pressure is sufficient to force it down through the pipe 23a. After this initial starting up procedure all the compartments 21, 21a, 21b will be filled with liquid up to the tops of their respective overflow pipes 23, 23a, 23b and the gas will flow continuously down through the compartments. It will be appreciated that the diameters of the pipes 23, 23a, 23b should be so chosen, in relation to the rate of supply of the liquid and the rate of evolution of the gas, that the pipes will not be filled with liquid and the drop in pressure between successive compartments will not be too great. It will also be apparent that the supply pressure of the mixture in the line 13 should be higher than the pressure prevailing in the top compartment 21.

After passing through all the compartments 21, 21a, 21b the gas is withdrawn through an outlet 31 located at an intermediate point on the vessel. The withdrawn gas may be passed through a condenser 32 and a cyclone separator 33 for the removal of any normally liquid constituents, which may be returned to the vessel through a line 34 (having the usual liquid trap, not shown), the uncondensed gas being discharged, for any appropriate use, through a line 36.

The zone of the vessel 16 below the gas outlet 31 may be termed a finishing zone 37 where the reaction goes to completion. This zone 37 is preferably provided with baffles 38 to diminish back-mixing or recirculation of the reaction mixture passing therethrough. The liquid reaction mixture is withdrawn from the bottom of the vessel 16 and may be passed through a cooler 39. As shown in the drawing the liquid level in the finishing zone 37 is maintained just below the level of the gas outlet 31. This may be effected by any suitable liquid level controller, of conventional type (not shown), for regulating the withdrawal of liquid from the bottom of the vessel 16.

It will be appreciated that during operation the pressure in the vessel 16 is highest in the top compartment 21 and decreases stepwise in succeeding lower compartments.

It is preferred to use a small excess (e.g. about 5 to 20% excess) of the phenol, in the presence of a catalyst for the reaction, e.g. magnesium chloride or stannic chloride. One suitable range of reaction temperatures is about 150 to 300° C.

As stated, the catalyst may be magnesium chloride. We have found that although this material does not dissolve in either phosphorus oxychloride or cresylic acid, it does dissolve at room temperature in a mixture of these materials. According to one aspect of this invention the magnesium chloride is mixed with both the reactants before they are heated to the reaction temperature and, after solution has taken place, the resulting blend is fed to the reaction zone.

The apparatus described is compact, easy to construct and maintain, and operates very efficiently.

The following example is given to illustrate this invention further.

Example I

A mixture of 399 parts of cresylic acid, 153 parts phosphorus oxychloride and 3 parts freshly ground magnesium chloride was passed through a reaction tower of the type shown in the drawing and having a series of six reaction chambers of equal volume disposed above a finishing zone, whose effective volume, for liquid, was about twice that of each chamber. The heating jacket was filled with hendecanone (B.P. 235° C.) under reflux at atmospheric pressure and the entire tower was thus maintained at 233 to 235° C., except for the first chamber where the temperature was 219° C. As the mixture passed through the tower the catalyst dissolved. At a residence time of 53 minutes in the tower the acidity of the product expressed in mg. KOH per gram, was 4.8. When the feed rate was decreased so as to raise the residence time to 148 minutes the acidity was decreased to 3.3.

The cresylic acid used as a reactant had an average molecular weight of about 121 and had the following approximate composition:

| | Percent |
|---|---|
| $C_{10}$ phenols | 0.5 |
| $C_9$ phenols | 10.0 |
| Xylenols | 72.0 |
| Cresols | 14.5 |
| Phenol | 3.0 |

Example II

Example I was repeated except that an electrically heated reaction column having 14 compartments was employed, with the size of the compartments increasing along the line of flow. The diameter of the column was uniform (1 inch) throughout, but the top five compartments were 1½ inches in depth, the next four were 2 inches in depth, and the last five were three inches in depth. The entrance end of each overflow pipe was located at a height, above the base of said compartment, equal to ⅔ the total height of said compartment, while its discharge end was about ¼ inch above the base of the next compartment. The temperature increased gradually along the column; in the top five compartments the average temperature was about 175° C., in the next four it was about 235° C., while in the last group it was about 245° C. The finishing zone at the bottom of the column was at 260° C., while the temperature of the mixture entering at the very top of the column was 102° C. The ratio of the total volume of liquid in all compartments to the volume of liquid in the finishing zone was 14:15. At a residence time of 28 minutes in the apparatus, the product obtained had an acidity of 4.1.

It is to be understood that the foregoing detailed description is given merely by way of illustration and that many variations may be made therein without departing from the spirit of our invention.

Having described our invention, what we desire to secure by Letters Patent is:

1. In the process for the production of esters by the reaction of a liquid mixture of phosphorus oxychloride and a phenol which is reactive with said phosphorus oxychloride to produce a monomeric ester of said phenol and said phosphorus oxychloride, with evolution of hydrogen chloride gas, the improvement which comprises passing the reaction mixture continuously through a series of successive separate reaction chambers, and passing hydrogen chloride gas collected in one chamber under pressure into and through the liquid reacting mixture in a succeeding chamber.

2. In the process for the production of esters by the reaction of a liquid mixture of phosphorus oxychloride and a phenol which is reactive with said phosphorus oxychloride to produce a monomeric ester of said phenol and said phosphorus oxychloride with evolution of hydrogen chloride gas, the improvement which comprises passing the reaction mixture continuously through a series of successive separate reaction chambers partially filled with said mixture, and passing hydrogen chloride gas collected in the upper part of one chamber under pressure into and through the liquid reacting mixture in the next chamber.

3. Process as set forth in claim 2 in which said liquid mixture comprises phosphorus oxychloride and cresylic acid.

4. Process as set forth in claim 3 in which said mixture contains excess cresylic acid.

5. Process as set forth in claim 4 in which said mixture contains a catalyst for the reaction which catalyst is soluble in the mixed reactants.

6. Process as set forth in claim 5 in which the catalyst is magnesium chloride and said catalyst is dissolved in the mixed reactants before said reaction.

7. In the process for the production of esters by the reaction of a liquid mixture of reactants comprising phosphorus oxychloride and a phenol which is reactive with said phosphorus oxychloride to produce a monomeric ester of said phenol and said phosphorus oxychloride with evolution of hydrogen chloride gas, the improvement which comprises effecting said reaction by introducing said reactants into the top of a reaction column, formed into a series of separate reaction chambers, disposed one above the other, passing the liquid reaction mixture downward through said chambers, collecting hydrogen chloride gas at the top of each chamber under pressure and passing said collected hydrogen chloride gas under pressure through the liquid reaction mixture in the next chamber.

References Cited by the Examiner

UNITED STATES PATENTS

| | | | |
|---|---|---|---|
| 2,078,421 | 4/37 | Shuman | 260—461 |
| 2,275,041 | 3/42 | Britton et al. | 260—461 |
| 2,450,903 | 10/48 | Mikeska | 260—461 |
| 2,680,675 | 6/54 | Groebe | 23—283 |
| 2,717,202 | 9/55 | Bailey | 23—283 |
| 3,061,652 | 10/62 | Cayton et al. | 260—654 |

FOREIGN PATENTS

| | | |
|---|---|---|
| 609,682 | 11/60 | Canada. |
| 856,664 | 12/60 | Great Britain. |

CHARLES B. PARKER, *Primary Examiner.*

M. LIEBMAN, IRVING MARCUS, JOSEPH P. BRUST,
*Examiners.*